United States Patent [19]

MacFarlane

[11] Patent Number: 4,624,538
[45] Date of Patent: Nov. 25, 1986

[54] COMA-COMPENSATION TELESCOPE

[75] Inventor: Malcolm J. MacFarlane, Newtown, Conn.

[73] Assignee: The Perkin-Elmer Corporation, Norwalk, Conn.

[21] Appl. No.: 737,762

[22] Filed: May 28, 1985

[51] Int. Cl.⁴ .................... G02B 23/06; G02B 13/14; G02B 17/00

[52] U.S. Cl. ................................. 350/620; 350/1.1; 350/505; 350/612

[58] Field of Search ................ 350/620, 505, 1.1, 1.2, 350/1.4, 537, 612, 618, 619

[56] References Cited

U.S. PATENT DOCUMENTS

| | | | |
|---|---|---|---|
| 2,972,743 | 2/1961 | Svensson et al. | 350/620 X |
| 2,976,533 | 3/1961 | Salisbury | 350/620 X |
| 3,887,263 | 6/1975 | Thompson, III | 350/620 X |
| 4,439,012 | 3/1984 | Christy | 350/620 X |
| 4,494,819 | 1/1985 | Lidwell | 350/1.1 X |
| 4,521,068 | 6/1985 | Baumen | 350/505 X |

OTHER PUBLICATIONS

Bottema et al.; "Third Order Aberrations in Cassegrain-Type Telescopes and Coma Correction"; Applied Optics; vol. 10, No. 2, Feb. 1971; pp. 300-303.

Primary Examiner—John Petrakes
Attorney, Agent, or Firm—Thomas P. Murphy; Edwin T. Grimes; Francis L. Masselle

[57] ABSTRACT

A telescope for eliminating on axis coma due to tilt of the secondary mirror in infrared astronomy. The secondary mirror of a reflecting telescope is formed to cause field coma to always be equal and opposite at the optical axis of the telescope to tilt coma regardless of the angle through the secondary mirror is tilted with respect to the optical axis.

5 Claims, 2 Drawing Figures

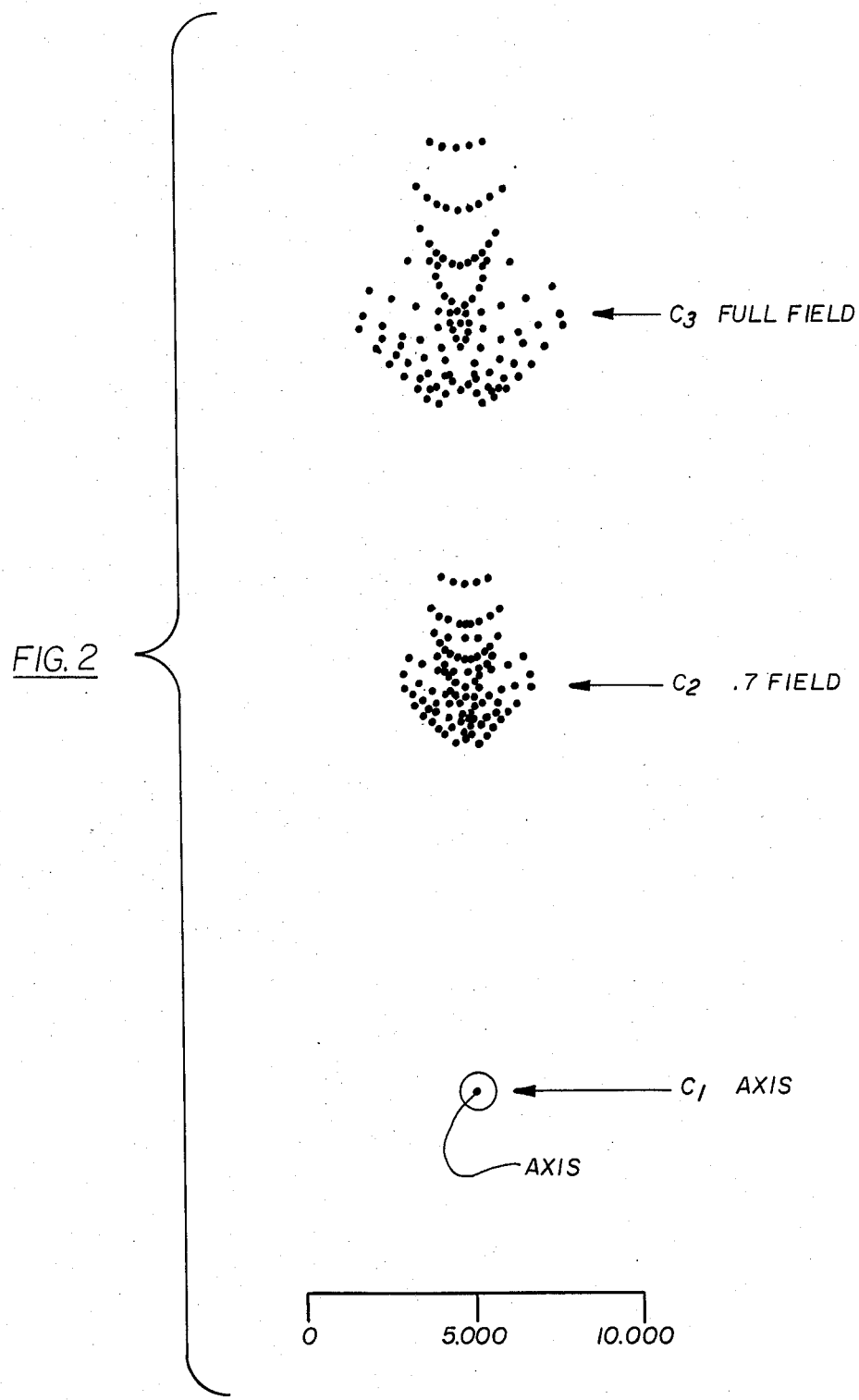

COMA-COMPENSATION TELESCOPE

The invention described herein was made in the performance of work under NASA Contract No. NAS 2-11551 and is subject to the provisions of Section 305 of the National Aeronautics and Space Act of 1958 (72 Stat. 435; 42U.S.C. 2457).

BACKGROUND OF THE INVENTION

In telescopic observation of infrared phenomena it is necessary to be able to distinguish infrared radiation emanating from the object, e.g., a star to be observed from ambient radiation. This is ordinarily accomplished by tilting the secondary mirror in a cyclical fashion from the optical axis where it views the star or other object under observation to an angle off the optical axis where it views the sky minus the star. This is done twenty or more times a second and provides an a.c. signal made up during each half cycle of the background radiation plus radiation from the star and during each other half cycle of the background radiation alone. This permits the radiation as seen by an on axis detector representative of background radiation to be subtracted from the radiation as seen by the detector representative of background radiation plus radiation of the star leaving only radiation representative of the star alone. A serious disadvantage of this method is that the tilting or chopping by the secondary mirror introduces coma which degrades the resolving power of the telescope.

The present invention overcomes this problem and provides an on-axis coma free image of the object under observation at any tilt angle of the secondary mirror.

SUMMARY OF THE PRESENT INVENTION

The present invention relates to a telescope for use in infrared astronomy which eliminates on axis coma regardless of the tilt of the secondary mirror.

The present invention comprises a two mirror telescope, i.e., one having primary and secondary mirrors. The present invention makes use of the existence of field coma inherently present in the design of typical two mirror telescopes. This field coma grows linearly in size depending on how far off axis an image is viewed but it is independent of the tilt angle of the secondary. It is a function of the design of the secondary mirror. Tilt coma grows linearly with the angle of tilt and is independent of the design of the secondary mirror. The present invention resides in adjusting the shape of the secondary mirror to balance the field coma at some off axis angle against the tilt coma. Having done this, on axis coma is eliminated for any tilt angle which the secondary mirror may make with the mechanical axis of the telescope as the secondary mirror is caused to be tilted back and forth with respect to the mechanical axis. To complete the structure spherical aberration is then cancelled by adjusting the shape of the primary mirror so that the axial detector sees a nearly perfect image throughout the range of the secondary mirror tilt until the tilt angle approaches such a size that field curvature causes a defocus of the image.

BRIEF DESCRIPTION OF THE DRAWING

FIG. 2 is a field of view of a typical two mirror telescope showing field coma.

DESCRIPTION

Figure 1:
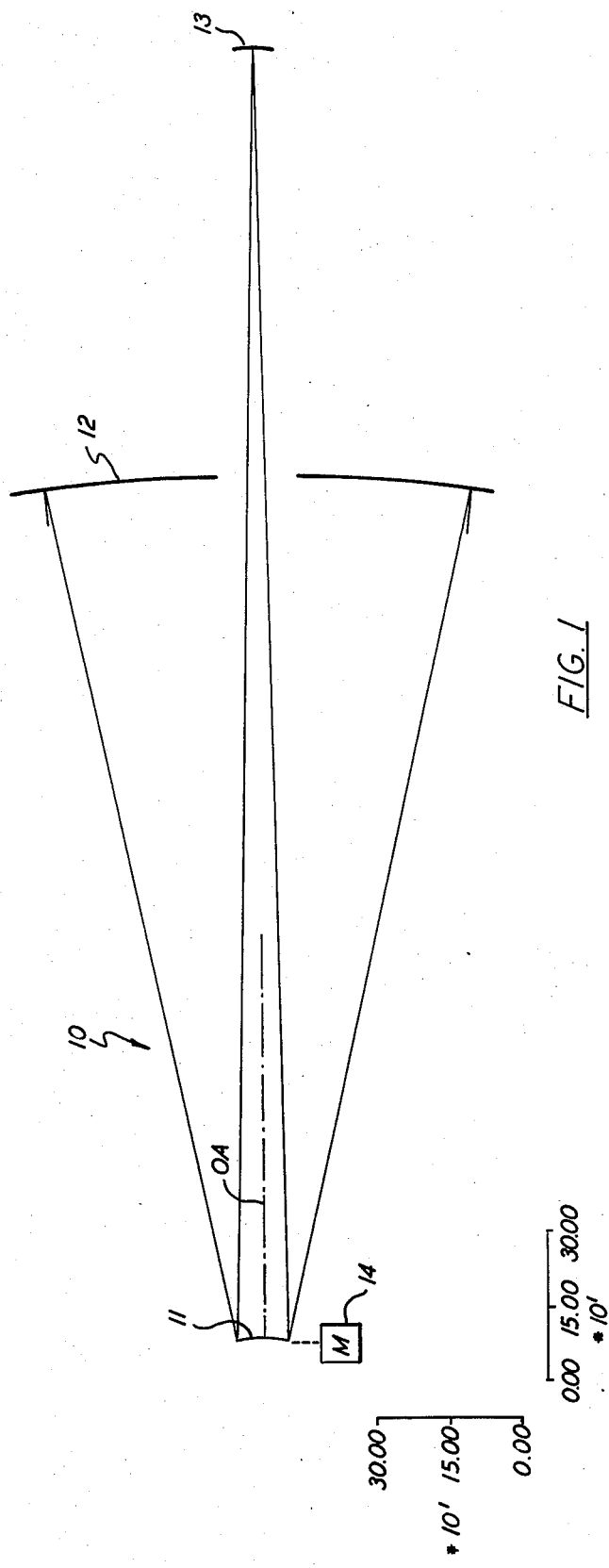
FIG. 1 is a schematic of a typical two mirror telescope capable of embodying the present invention.

FIG. 1 illustrates a typical two mirror telescope 10 which may be of the Cassegrain or Gregorian type, i.e., one which typically inherently has field coma due to the shape of the secondary mirror 11. The telescope 10 comprises the secondary mirror 11 and a primary mirror 12. As in all such telescopes, rays enter the telescope and reflect from the primary mirror 12 to the secondary mirror and thence to a focal point where an infrared detector 13 or other viewing device may be positioned. Motor 14 which is mechanically connected to secondary mirror 11 is used to cause secondary mirror 11 to tilt back and forth continuously relative to the optical axis, i.e., mechanical axis OA.

FIG. 2 is the field of view as seen by detector 13 when the telescope system of FIG. 1 is in symmetrical balance, i.e., the secondary mirror 11 is not tilted. This view shows the field coma phenomena wherein a star, e.g., $C_1$ or the like on axis is virtually aberration free but stars, e.g., $C_2$ and $C_3$ off axis have coma which grows linearly in proportion to their distance from the center of the field, i.e., from the optical axis or mechanical axis of the telescope. This type of coma, i.e., field coma is an intrinsic phenomena directly related to the shape, i.e., the conic constant $K_s$ of the secondary mirror. This type of coma is virtually independent of the tilt angle of the secondary mirror 11.

However, when the secondary mirror 11 is tilted for any reason, e.g., back and forth about axis OA to eliminate background radiation in infrared observations as previously described, tilt coma is introduced. This type of coma is directly related to tilt angle but is independent of the shape of the secondary mirror.

Thus, two types of coma contribute to the coma seen on axis by the detector 13 when secondary mirror 11 is tilted. These are the field coma and tilt coma discussed above. In other words, when the secondary mirror is tilted the detector sees a combination of the two comas, both of which are linearly related to the distance from the axis.

In any two mirror telescope the following set of five independent parameters define the telescope to the first order:

$D_p$ = Diameter of the entrance pupil
$F$ = System focal ratio
$F_p$ = Primary mirror focal ratio
$E$ = Vertex back focus divided by $D_p$
$\phi$ = Semi-field of view Further, magnification of the secondary mirror is given by:

$$m = F/F_p \tag{1}$$

The required mirror separation normalized by $D_p$ is:

$$S = (F-E)/(m+1) \tag{2}$$

The normalized focal length of the secondary mirror is:

$$F_s = m/(1-m^2)(F_p+E) \tag{3}$$

Furthermore the conic constants of the primary and secondary mirrors, $K_p$ and $K_s$, respectively are defined such that when:

$K = 1$: the surface is spherical
$K = 0$: the surface is paraboloidal

K<0: the surface is hyperbolidal

The Seidel coefficients of spherical aberration $S_I$ and coma $S_{II}$ which define third order imagery of a two mirror telescope are given by the equations:

$$S_I = \frac{1}{8F_p^3 D_p^3} \left[ K_p - \left\{ (K_s - 1) + \left( \frac{m+1}{m-1} \right)^2 \right\} \left( \frac{m-1}{m} \right)^3 \frac{F_p + E}{F + F_p} \right] \quad (4)$$

$$S_{II} = \frac{1}{8F_p^2 D_p^2} \left[ \frac{2}{m^2} + \left\{ (K_s - 1) + \left( \frac{m+1}{m-1} \right)^2 \right\} \left( \frac{m-1}{m} \right)^3 \frac{F - E}{F + F_p} \right] \quad (5)$$

The field coma at any angle $\phi$ is given by:

$$FC = 3 S_{II} D_p^2 \phi \quad (6)$$

and for any angle $\epsilon$ the tilt coma is given by $$TC = 3(m+1)(m-1)^2 F_s (\epsilon / 16 F^3) \quad (7)$$

From equations (5) and (7) it can be seen that the field coma in a perfectly aligned telescope is field dependent and also dependent on the shape or conic constant $K_s$ of the secondary mirror. The tilt coma is independent of these properties.

When the secondary mirror 11 is tilted, tilt coma appears. Since the tilt effectively makes detector 13 look at an off-axis point, the field coma inherent in the telescope appears. Both of these comas vary linearly with distance from axis, i.e., tilt coma grows linearly with tilt angle and the field coma gets bigger linearly with distance from the axis. Thus, by making the two comas cancel at any non-zero field point when the detector is looking at it, they are cancelled on axis for all angles.

Tilting the secondary mirror 11 about its vertex by a small amount $\epsilon$, this is equivalent to decentering its center of curvature by an amount $\Delta Y_{cc}$ where:

$$\Delta Y_{cc} = \epsilon R_s \quad (8)$$

where R is the radius of curvature of the secondary mirror ($R_s = 2 F_s D_p$).

From equation (3)

$$\Delta Y_{cc} = 2 \epsilon F_s D_p = \frac{2 m D_p}{1 - m^2} (F_p + E) \epsilon \quad (9)$$

This decentration causes a lateral image motion $\Delta Y'$ of amount $$\Delta Y = (1 - m) \Delta Y_{cc} \text{ or} \quad (10)$$

$$\Delta Y = \frac{2 m D_p}{(1 + m)} (F_p + E) \epsilon$$

Since the detector 13 remains stationary at the telescope's mechanical axis, i.e. optical axis, it is now looking out of telescope 10 at an angle $\phi$ where:

$$\phi = \frac{\Delta Y}{F D_p} = -2(F_p + E) \epsilon / F + F_p \quad (11)$$

To determine the conic constant $K_s$ of the secondary mirror necessary to eliminate on axis coma we can now set the expression representative of field coma at any angle $\phi$ equal to the tilt coma $\epsilon$ where $\epsilon = \phi$ and $\phi$ and $\epsilon$ are related by equation (11). From equations (6) and (7) we have:

$$FC = -TC \text{ or} \quad (12)$$

$$3 S_{II} D_p^2 / 4 = -3(m+1)(m-1)^2 F_s \epsilon / 16 F^3$$

From equations (3) and (11) it can be shown that:

$$S_{11} = -(m^2 - 1)/8 F^2 D_p^2 \quad (13)$$

Substituting from equation (5)

$$\frac{2}{m^2} + \left\{ (K_s - 1) + \left( \frac{m+1}{m-1} \right)^2 \right\} \left( \frac{m-1}{m} \right)^3 \frac{F - E}{F + F_p} = -(m^2 - 1)/m^2 \quad (14)$$

Solving for $K_s$, i.e., conic constant of the secondary mirror necessary to elininate on-axis coma at any tilt angle of the secondary mirror 11 we have:

$$K_s = -\left( \frac{m+1}{m-1} \right)^2 \frac{m(m^2 + 1)}{(m-1)^3} \left( \frac{F + F_p}{F - E} \right) \quad (15)$$

Thus, by forming the secondary mirror 11 in accordance with the above equation representative of the conic constant of the secondary mirror on axis coma is eliminated for any angle of tilt limited only by astigmatism which is not controlled by this technique.

This shape of the secondary mirror turns out to be approximately twice the deformation normally required for a classical Cassegrain telescope. This relationship is also approximately correct for most other two mirror telescopes.

Since $K_s$ is known, $K_p$ the conic constant, i.e., the shape of the primary mirror can be chosen to eliminate spherical aberration providing an image on the mechanical axis where detector 13 is located over a wide range of tilt angles of the secondary mirror. Since $K_s$ is known, the shape $K_p$ of the primary mirror 12 is calculated from equation (4) by setting $S_1$, the Seidel coefficient of spherical aberration, to zero and solving for $K_p$. This gives:

$$K_p = -1 - \frac{m^2 + 1}{m^2} \left( \frac{F_p + E}{F - E} \right) \quad (16)$$

Other modifications of the present invention are possible in light of the above description which should not be construed as placing limitations on the invention other than those expressly set forth in the claims which follow:

What is claimed is:

1. In a two mirror telescope for use in infrared astronomy;
   a primary mirror;
   a secondary mirror disposed relative to said primary mirror to form a telescope;
   means for tilting one of said mirrors continuously back and forth relative to the mechanical axis of the telescope;
   said one of said mirrors being so constructed and arranged to have an intrinsic field coma on axis equal and opposite to tilt coma on axis at any tilt angle of said one mirror relative to said other mirror;
   an infrared detector disposed on the mechanical axis at the back focus point of the telescope.

2. A telescope according to claim 1 wherein said one of said mirrors is said secondary mirror.

3. A telescope according to claim 1 wherein said primary mirror is formed to eliminate on axis spherical aberration regardless of the tilt of said primary mirror.

4. A telescope according to claim 3 wherein the conic constant $K_s$ of said secondary mirror equals $$-\left(\frac{m+1}{m-1}\right)^2 - \frac{m(m^2+1)}{(m-1)^3}\left(\frac{F+F_p}{F-E}\right)$$

where
m = magnification of said secondary mirror,
F = system focal ratio
$F_p$ = primary mirror focal ratio
E = vertex back focus divided by $D_p$
$D_p$ = diameter of the entrance pupil.

5. A telescope according to claim 4 wherein the conic constant $K_p$ of said primary mirror equals $$-1 - \left(\frac{m^2+1}{m^2}\right)\left(\frac{F_p+E}{F-E}\right).$$

* * * * *